United States Patent [19]

Bush et al.

[11] 3,851,114

[45] Nov. 26, 1974

[54] TELEPHONE DISTRIBUTION PANEL

[75] Inventors: Stanley Edward Bush; Charles William Lewis; William John McKelvey, all of Boulder; Donald Leiman Merwede, Longmont; Kenneth Joseph Roberge; George Edwin Saltus, both of Boulder, all of Colo.

[73] Assignee: Bell Telephone Laboratories, Incorporated, Murray Hill, N.J.

[22] Filed: July 30, 1973

[21] Appl. No.: 384,091

[52] U.S. Cl. .................... 179/98, 317/116, 307/42
[51] Int. Cl. .................... H04q 1/14
[58] Field of Search ............. 179/91 R, 98, 94, 99; 317/122, 116, 119, 117, 118; 174/72 A; 307/42

[56] References Cited

UNITED STATES PATENTS

| | | | |
|---|---|---|---|
| 3,375,406 | 3/1968 | Alden | 317/122 |
| 3,518,611 | 6/1970 | Shores, Jr. | 317/122 |
| 3,535,463 | 10/1970 | Trucco | 179/98 |
| 3,573,373 | 4/1971 | Mullin et al. | 179/98 |
| 3,610,836 | 10/1971 | Kimura et al. | 179/98 |
| 3,643,133 | 2/1972 | Towell | 174/72 A |

*Primary Examiner*—Kathleen H. Claffy
*Assistant Examiner*—Gerald L. Brigance
*Attorney, Agent, or Firm*—H. L. Newman

[57] ABSTRACT

A telephone distribution panel that includes a plurality of connectors for accommodating printed circuit boards, and a like plurality of fuse sockets, lamp sockets and terminal arrays, all of which are exposed to the front of the panel. A flexible printed circuit secured to the back of the panel electrically interconnects each circuit board connector to an individual fuse socket, lamp socket, and terminal array and each connector has the same physical location relative to the other connectors as the fuse socket, lamp socket, and terminal array to which it is connected respectively have to the other fuse sockets, lamp sockets, and terminal arrays. Thus, it is apparent from the physical location of the components as to which are electrically connected to one another, and the installation and maintenance of the panels is greatly facilitated.

8 Claims, 4 Drawing Figures

TELEPHONE DISTRIBUTION PANEL

FIELD OF THE INVENTION

This invention relates to mountings for electrical apparatus and within that field to telephone distribution panels for key telephone and other systems.

BACKGROUND OF THE INVENTION

Key telephone systems include a number of key telephone sets, an individual line service circuit that provides switching, control, and signaling functions for each telephone line connected to the sets, a power supply for the circuits, and terminal arrays that serve as the interconnection point between the circuits and the sets. It is standard for each line service circuit to comprise a plug-in modular circuit unit, referred to as a key telephone unit. In addition, it is known to provide a support structure including circuit board guides and connectors for accommodating the key telephone units in close proximity to the distribution terminal arrays and to an array of fuses that provide protection for the key telephone units. Furthermore, it is known to factory prewire connections between the terminals of the key telephone unit connectors, the fuse sockets, and the terminal arrays.

However, heretofore the arrangement of the prewired interconnections between these elements has not been obvious to the installer or service man, and therefore until he has had a fair amount of experience with the equipment, he has had to take time to familiarize himself with this arrangement each time he worked with these connections. Furthermore, connections in addition to the pre-wired ones must be made by the installer or service man, and while these connections are standardized, they have not been organized in any obvious manner. It has therefore been essentially mandatory to refer to a connections manual in order to follow the standardized practices. The net result is that installation and servicing of such equipment has been time consuming and expensive.

Another aspect of this known equipment is that the individual fuse sockets are associated with several of the key telephone unit connectors, whereby no clear relationship exists between a failure of a fuse and a particular key telephone unit. This again results in making the servicing of the equipment more time consuming and thereby more expensive. Still another aspect of this known equipment is that it lacks any means for indicating when a line circuit is in operation. Thus when maintenance is necessary, the service man may inadvertently interfere with a call that is in process. Finally, this known equipment has the key telephone unit, connectors, fuse sockets, and terminal arrays either stacked on top of one another or placed back to back. Servicing of the equipment is therefore somewhat impeded when access to more than one of these elements is necessary.

SUMMARY OF THE INVENTION

A key telephone distribution panel in accordance with the present invention includes a multiplicity of key telephone unit connectors, fuse sockets, and terminal arrays all situated on a single surface of the panel so that they are all readily visible and accessible at the same time for servicing. In addition, an individual fuse socket is connected to each key telephone unit connector so that when a fuse operates it is immediately apparent as to the source of the trouble. Furthermore, an individual lamp socket is connected to each key telephone unit connector so that it is immediately apparent by the illumination of the lamp therein when the associated key telephone unit is in operation. Finally, an individual distribution terminal array is connected to each key telephone unit connector, and each terminal array, fuse socket, and lamp socket are physically located with respect to its associated connector so that it is readily apparent to the installer or service man as to what the associated components are. As a result, installation and servicing of the panel is achieved with minimum reference to instruction data.

DETAILED DESCRIPTION OF THE INVENTION

Figure 1:
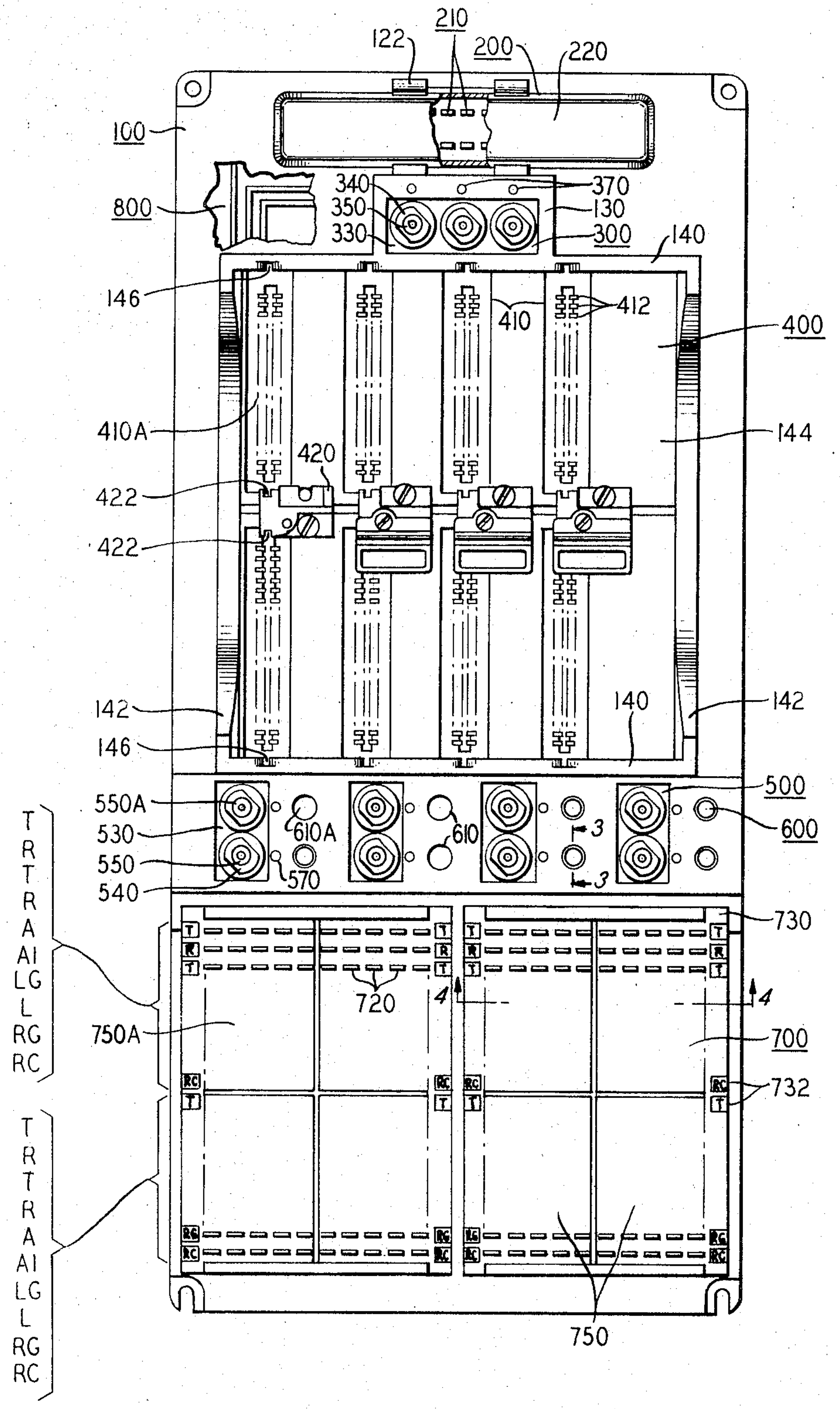
FIG. 1 is a front view of a telephone distribution panel in accordance with this invention; with portions broken away for greater clarity.

Referring to FIG. 1 of the drawing, a key telephone distribution panel in accordance with the present invention comprises a molded support 100 on which is situated a power input assembly 200, a power fuse assembly 300, a key telephone unit carrier assembly 400, a line circuit fuse assembly 500, a lamp assembly 600, a distribution terminal array assembly 700, and a flexible printed circuit 800.

Figure 2:
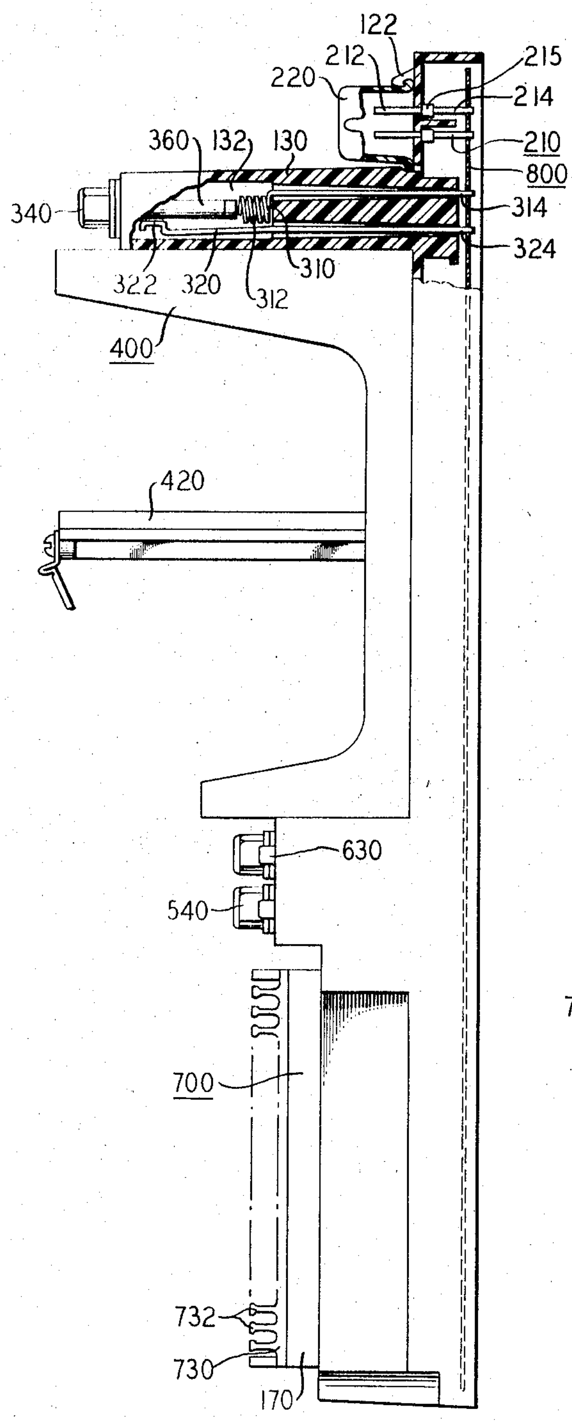
FIG. 2 is a side view of the panel with portions broken away for greater clarity.

The power input assembly 200 comprises a multiplicity of spaced wire-wrap terminals 210 advantageously arranged in two rows. The terminals 210 are rectangular post-like members, and as shown in FIG. 2 each terminal comprises a forward leg portion 212, a rear leg portion 214, and an enlarged center shoulder portion 215. The forward leg portion 212 of each terminal 210 is press fit into an opening in the support 100, and the shoulder portion 215 serves as a stop to axially locate the terminal so that the forward leg portion 212 extends beyond the front surface of the support while the end of the rear leg portion 214 extends through a plated termination hole in the flexible printed circuit 800. The conductors of a power input cable (not shown) are wire-wrapped on the forward leg portions 212 of the terminals 210, and a domed dielectric cover 220 is positioned thereover to prevent inadvertent engagement with the terminals or bared conductors. The left end of the cover 220, as viewed in FIG. 1, is open to provide ingress for the power input cable. The right end of the cover 220 is closed but it has a slot formed therein to facilitate flexing the sides of the cover toward each other. This flexure is used to hold the cover 220 in place, the rear edge of the upper side having an elongated tab protruding therefrom that is captured behind a pair of inverted L-shaped catches 122 integral to the panel 100 and the rear edge of the lower side having a pair of spaced tabs protruding therefrom that are respectively captured within recesses in the upper surface of a base portion 130 of the power fuse assembly 300.

The base portion 130 includes three parallel elongated cavities 132, one of which is shown in FIG. 2. Each cavity 132 accommodates a center spring terminal 310 including a helical contact portion 312 that is positioned at the bottom of the cavity and a leg portion 314 that extends rearwardly through an opening in the base portion. Each cavity 132 also accommodates a side terminal 320 including a U-shaped contact portion 322 that is positioned in a recess in the side of the upper end of the cavity and a leg portion 324 that extends along a groove in the side of the cavity and through an opening in the base portion 130. The rearward ends of leg portions 314 and 324 are respectively accommodated within termination holes in the flexible circuit 800.

The cavities 132 and terminals 310 and 320 cooperate with a cover 330 (FIG. 1) and a fuse cap 340 to provide three power fuse sockets 350. The cover 330 and fuse cap 340 are of a construction that is basically the same as that disclosed in U.S. Pat. No. 3,299,236 issued to T. H. Barker on Jan. 17, 1967, and as set forth therein the fuse cap in conjunction with the terminals 310 and 320 of each socket captures and makes electrical connection with an indicator type fuse cartridge 360. Such a fuse cartridge includes a visual indicating stem that protrudes out of the fuse cap when the fuse operates, and this stem is color coded to indicate the rating of the fuse cartridge. To assist in the replacement of the fuse cartridge, an indicating marker 370 of the same color is mounted adjacent to each fuse cap 340 in the front end of the base portion 130.

As seen most clearly in FIG. 1, situated beneath the power fuse assembly 300 is the key telephone unit carrier assembly 400 which includes spaced shelves 140 joined by side ribs 142. A rear wall 144 extending between the shelves 140 accommodates eight circuit board connectors 410 that are advantageously secured in place in basically the same way as disclosed with respect to FIGS. 7 and 8 of U.S. Pat. No. 3,705,377 issued to E. L. Hansen et al. on Dec. 5, 1972. The connectors 410 are grouped in pairs that are spaced laterally from one another, and the connectors in each pair are spaced from and in longitudinal alignment with one another.

A forwardly extending guide 420 is fastened to the wall 144 between each pair of connectors 410, and each guide includes a pair of opposed grooves 422 that are aligned with facing grooves 146 in the shelves 140. Each groove 146 in a shelf 140 cooperates with a facing groove 422 in the associated guide 420 to direct a line service circuit key telephone unit (not shown) into engagement with contacts 412 of an individual connector 410, each contact including a rearwardly extending leg portion that extends through a termination hole in the flexible circuit 800.

The line circuit fuse assembly 500, which is below the carrier assembly 400, includes four pairs of line fuse sockets 550 that have essentially the same construction as the power fuse sockets 350 of the power fuse assembly 300, and reference characters having corresponding tens digits have been applied to the drawing to indicate corresponding elements. The pairs of line fuse sockets 550 are spaced laterally from one another, and the fuse sockets in each pair are spaced from and in longitudinal alignment with one another. Consequently, the line fuse sockets 550 have the same orientation as the key telephone unit connectors 410.

Figure 3:
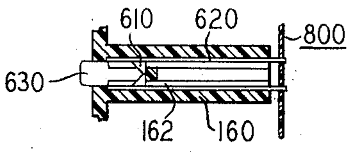
FIG. 3 is a sectional view taken along line 3—3 of FIG. 1 showing one of the lamp and lamp sockets.

Similarly, the lamp assembly 600 comprises eight busy lamp sockets 610 that are grouped in pairs, each pair of lamp sockets being located along side of a pair of line fuse sockets 550 and each lamp socket being in lateral alignment with an individual fuse socket. As shown in FIG. 3 each busy lamp socket 610 comprises a cavity 162 in a portion 160 of the support 100, opposed sides of the cavity including recesses in which terminals 620 are positioned. Each terminal 620 includes a contact portion at the forward end thereof that engages the contact portion of a lamp 630 positioned within the socket 610 and a leg portion that extends through an opening in the rear of the cavity 160 into a termination hole in the flexible circuit 800.

Figure 4:
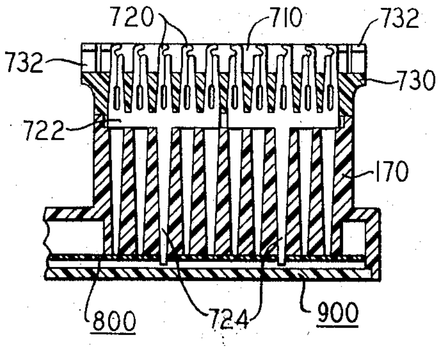
FIG. 4 is a sectional view taken along line 4—4 of FIG. 1 showing a pair of adjacent quick connect terminals used in the terminal arrays.

Turning now to FIGS. 1, 2, and 4, the distribution terminal array assembly 700 is situated at the lower end of the support 100 and it comprises a pair of terminal fields 710 that include a multiplicity of insulation piercing quick-connect terminals 720 of the type disclosed in U.S. Pat. No. 3,112,147 issued to W. Pferd et al. on Nov. 26, 1963. As seen most clearly in FIG. 4, the terminals 720 of each terminal field 710 are accommodated within slots in a base portion 170 of the support 100 and held in place by block 730 secured to the base portion. The terminals 720 are either ganged together by an integral strap 722 in a multiple of five as shown or are individual terminals. In either case, each includes a leg portion 724 that extends through an opening in the base portion 170 into a termination hole in the flexible circuit 800.

Each terminal field 710 is divided into four quadrants to provide eight terminal arrays 750 that, like the connectors 410 and fuse sockets 550, are arranged in pairs side by side one another, the terminal arrays in each pair being arranged in a column in direct alignment with one another. The side edges of the block 730 include a column of fanning posts 732 for separating the conductors of a cable preparatory to connection to the terminals 720 of each array 750. Each post 732 is aligned with a row of terminals 720 and as shown in FIG. 1 each post is embossed with indicia that indicates the function of the terminals in alignment therewith, this indicia being repeated for each terminal array 750.

From the foregoing it should be clear that the flexible printed circuit 800 serves to electrically interconnect the wire-wrap terminals 210, the power fuse sockets 350, the printed circuit board connectors 410, the line circuit fuse sockets 550, lamp sockets 610, and terminal arrays 750. The flexible circuit 800 connects the power input terminals 210 to identical contacts of each circuit board connector 410 and to the same quick-connect terminals 720 of each terminal array 750, selected ones of the power input terminals being connected through an individual power fuse socket 350. The remainder of the contacts of each circuit board connector 410 are respectively connected to the quick-connect terminals 720 of the terminal array 750 having the same location with respect to the other terminal arrays as the connector has with respect to the other connectors. In addition, one of the contacts of each circuit board connector 410 is connected to its associated terminal array 750 through a line circuit fuse socket 550 having the same location with respect to the other line circuit fuse sockets as the connector has with respect to the other connectors. Finally, each connector 410 is connected to a busy lamp socket 610 having the same location with respect to the other lamp sockets as the connector has to the other connectors.

Thus, connector 410A is electrically connected to the fuse socket 550A, the lamp socket 610A, and the terminal array 750A. It is therefore seen that a symmetry exists between the physical location of the connector, fuse socket, lamp socket, and the terminal array that are interconnected with one another. This symmetry greatly facilitates installation and maintenance of the panel.

What is claimed is:

1. A telephone distribution panel comprising a support including a plurality of connectors, a like plurality of fuse sockets, and a like plurality of terminal arrays, means for electrically connecting each connector to an individual fuse socket and terminal array, each connector having the same physical location relative to the other connectors as the fuse socket to which it is connected has to the other fuse sockets and the terminal array to which it is connected has to the other terminal arrays.

2. A telephone distribution panel as in claim 1 further including a like plurality of lamp sockets and means for electrically connecting each lamp socket to an individual connector, each lamp socket having the same physical relationship to the other lamp sockets as the connector to which it is connected has to the other connectors.

3. A telephone distribution panel as in claim 2 wherein the connectors, fuse sockets, lamp sockets and terminal arrays are all situated on a single surface of the panel.

4. A telephone distribution panel as in claim 1 wherein the plurality of connectors are arranged in a group, the plurality of fuse sockets are arranged in a group, and the plurality of terminal arrays are arranged in a group, the groups being separated from one another.

5. A telephone distribution panel as in claim 4 wherein the group of connectors comprises connector pairs arranged side by side one another, the connectors in each pair being arranged in a column in direct alignment with one another; the group of fuse sockets comprises fuse socket pairs arranged side by side, the fuse sockets in each pair being arranged in a column in direct alignment with one another; and a group of terminal arrays comprises terminal array pairs arranged side by side one another, the terminal arrays in each pair being arranged in a column in direct alignment with one another.

6. A telephone distribution panel as in claim 5 wherein the associated connector pair, fuse socket pair and terminal array pair are generally one above the other.

7. A telephone distribution panel as in claim 6 further including a like plurality of lamp sockets and means for electrically connecting each lamp socket to an individual connector, each lamp socket having the same physical relationship to the other lamp socket as the connector to which it is connected has to the other connectors.

8. A telephone distribution panel as in claim 7 wherein the plurality of lamp sockets are interspersed with the plurality of fuse sockets, the lamp sockets being arranged in pairs that are respectively positioned along side fuse socket pairs, the lamp sockets in each pair being arranged in lateral alignment with an associated fuse.

* * * * *